United States Patent

Gill

[11] Patent Number: 4,704,956
[45] Date of Patent: Nov. 10, 1987

[54] COOKING APPARATUS

[76] Inventor: William H. Gill, Rte. 179, Lambertville, N.J. 08530

[21] Appl. No.: 944,088

[22] Filed: Dec. 22, 1986

[51] Int. Cl.⁴ .................................................. A22C 7/00
[52] U.S. Cl. ......................................... 99/427; 99/372; 99/374
[58] Field of Search ................. 99/427, 426, 423, 372, 99/377, 374, 386, 348, 352, 379

[56] References Cited

U.S. PATENT DOCUMENTS

| | | | |
|---|---|---|---|
| 2,009,791 | 7/1935 | Shroyer | 99/377 |
| 2,469,595 | 5/1949 | Foster | 99/374 |
| 3,298,303 | 1/1967 | Waller | 99/423 |
| 3,312,161 | 4/1967 | Nanna | 99/377 |
| 3,635,150 | 1/1972 | Piedaliu | 99/348 X |
| 3,707,906 | 1/1973 | Marrie | 99/372 |
| 3,949,660 | 4/1976 | Kuhlman | 99/352 |
| 4,027,139 | 5/1977 | Theimer | 99/372 X |
| 4,055,677 | 10/1977 | White | 99/386 X |
| 4,165,682 | 8/1979 | Weiss | 99/331 |
| 4,241,650 | 12/1980 | John et al. | 99/372 |
| 4,522,117 | 6/1985 | Weimer et al. | 99/348 |

Primary Examiner—Louis K. Rimrodt
Assistant Examiner—J. L. Olds
Attorney, Agent, or Firm—Sperry, Zoda & Kane

[57] ABSTRACT

A device for preparing such food items as omelets, fried eggs, and other foods cooked in a fry pan, skillet, or the like, includes means for horizontally reciprocating the cooking vessel while applying heat thereto. A generally conventional fry pan is quickly, separably attachable to reciprocating means, and during the reciprocal action imparted to the fry pan, heat is applied above and below the same to complete the cooking process during the continuous application of a gentle, back and forth movement to the vessel.

12 Claims, 5 Drawing Figures

COOKING APPARATUS

BACKGROUND OF THE INVENTION

1. Field Of The Invention

The present invention relates generally to cooking apparatus. In a more particular sense, the invention relates to apparatus of this type in which motion is imparted to a cooking vessel concurrently with heating of the contents thereof. In a still more particular sense, the invention relates to the application, by motor driven means, of a substantially horizontal reciprocating movement to a cooking vessel such as a fry pan or skillet. Though the invention refers primarily to an omelet maker, it has application to the cooking of any of various foods in which it is desirable to impart motion to the vessel sufficient to prevent the food being cooked from sticking and burning.

2. Description Of The Prior Art

Heretofore, it has been proposed to provide devices for imparting movement, including reciprocating motion, to a culinary vessel concurrently with the application of heat thereto. However, in the prior art, so far as is known there has been no suggestion for imparting motion to the cooking pan faithfully simulating that which would be imparted thereto manually. Further, so far as is known there has been no suggestion for the concept of utilizing the handle of a basically conventional fry pan or the like, as a support member slidable in a cradle so as to guide the culinary vessel during the reciprocating motion found desirable to cook such foods as omelets, fried eggs, fried or hash brown potatoes, etc.

Still further, so far as is known there has been no concept in the prior art disclosures for utilizing a fry pan which in and of itself is completely conventional, requiring no more than the application of a metal hook or equivalent element, whereby the fry pan can be swiftly engaged with the reciprocating mechanism with no more difficulty than one would normally experience in placing a fry pan upon a stove.

The present invention has as its general purpose the provision of a device which will eliminate the deficiencies in the prior art noted above.

It is a further important object of the present invention to provide a device of the type stated which can be utilized in the home, as compared to many of the prior art devices which have been designed primarily for institutional use with multiple cooking vessels and expensive, complex operating mechanisms.

Still another object of importance is to provide a device of the type stated which can be manufactured in a compact form, and can be designed for use as a household appliance capable of occupying a minimum amount of space on a typical residential kitchen counter, with the device being adapted for use merely by plugging in a convenience cord, in an adjacent electrical receptacle through which ordinary house current is available.

SUMMARY OF THE INVENTION

Summarized briefly, the present invention includes a housing for a drive motor or the like, having associated therewith a motion translating mechanism terminating in an upwardly facing hook element. A basically conventional fry pan or the like, having a down-turned hook diametrically opposite its handle, is quickly engageable with the up-turned hook element of the motion translating mechanism. When so engaged, the fry pan is supported in a position slightly elevated above a lower heating element. An upper heating element (which could also be used alone as a broiler element) is provided upon a hinged cover means, so that it can be swung downwardly into position above the fry pan when the fry pan is engaged with the reciprocating means. The invention may incorporate a timer, means accessible to a user for adjusting the heat, and other means accessible to a user for adjusting the speed of reciprocating movement imparted to the fry pan. Current is supplied both for the reciprocating means and the heating elements, through a convenience cord adapted to be plugged into an adjacent outlet.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENTS

Figure 1:
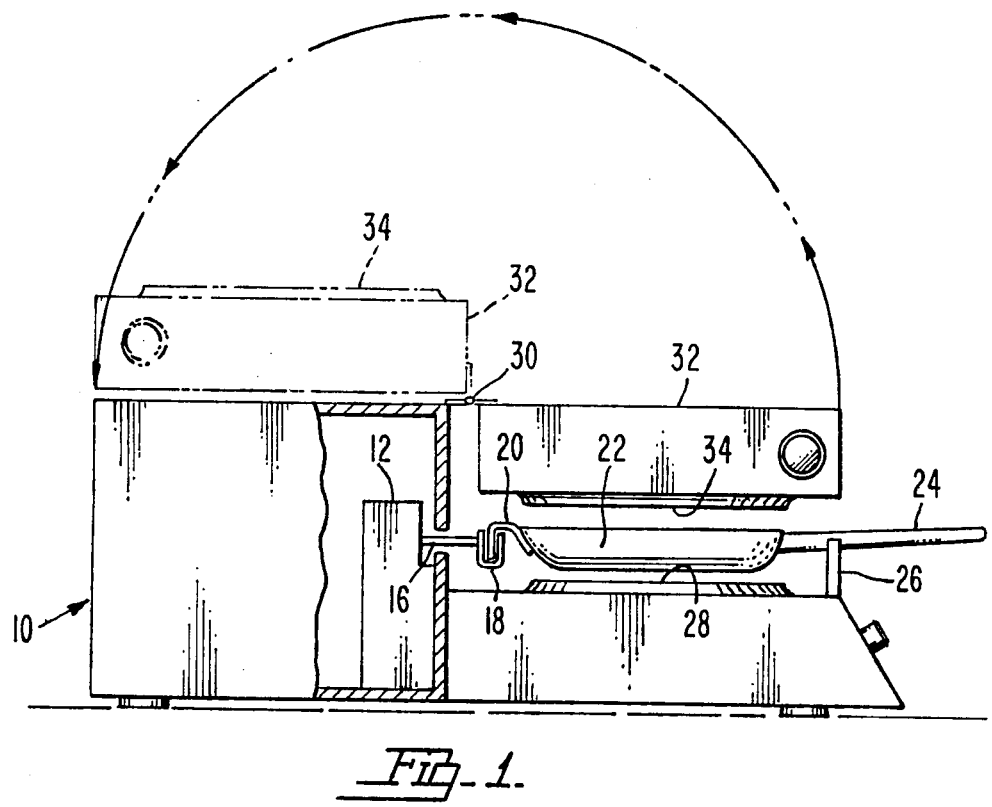
FIG. 1 is a side elevational view, portions being broken away, of a cooking apparatus constructed in accordance with the present invention, a cover means being shown in full lines in its operative, lowered position and in dotted lines in its inoperative location.

Referring to the drawing in detail, the reference numeral 10 has been applied generally to the cooking apparatus comprising the present invention. Designated at 12 is a motor driven reciprocating means including a forwardly projecting, horizontally disposed, elongated reciprocating arm 16 terminating, at its forward, distal end, in an upwardly opening, U-shaped connecting bracket 18.

It will be understood that the reciprocating mechanism 12 can be a conventional device such as the mechanism used to impart reciprocating motion to the blade of a saber saw. A device of this type includes a motor, not shown in FIG. 1, the shaft of which is attached to a motion-translating mechanism that converts rotary motion of the shaft to reciprocating motion of the forwardly projecting arm 16.

Motor driven devices adapted to impart rectilinear reciprocating motion to an element such as the arm 16 are well known in and of themselves.

As shown, the arm 16 projects through an opening formed in the front wall of the housing of the apparatus, to an extent such that the upwardly opening bracket 18 is adapted to receive the depending, distal end of an inverted U-shaped bracket 20 fixedly secured to the outer surface of the side wall of a cooking vessel such as a fry pan or skillet 22 having a flat bottom, or a bottom that is at least substantially flat, merging smoothly along curving lines into the side wall of said pan.

Diametrically opposite the bracket 20, the fry pan 22 is provided with a fixedly secured handle 24, projecting outwardly through the upwardly opening recess of a guide bracket 26 mounted upon a housing for a lower heating element 28.

When the fry pan 22 is positioned as shown in FIG. 1, with the bracket 20 engaged in bracket 18 and the handle 24 slidably supported upon guide bracket 26, the bottom of the fry pan is spaced closely from the lower heating element 28.

Heating element 28 is itself of a conventional design, and can be any of various types of heating elements, such as a typical spiraling heating element used on electric ranges.

Secured by a hinge 30 to the upper end of the housing, above the fry pan 22, is a cover member 32, having in its underside a heating element 34 of the electrical type, so located that when the cover element is in the full line position of FIG. 1 (that is, in its operative position), the heating element 34 will be disposed above the fry pan 22, in concentric relation to the fry pan and to the lower element 28.

In this way, when the device is in use, the contents of the fry pan will be heated from above and below, to provide a uniform heat application to the contents of the pan.

Normally, when the device is not in use, the cover member 32 is swung upwardly in the direction of the arrow shown in FIG. 1, to a rest or inoperative, out-of-the-way position shown in dotted lines in FIG. 1. In this position, the cover member overlies the housing of the reciprocating mechanism.

Figure 2:
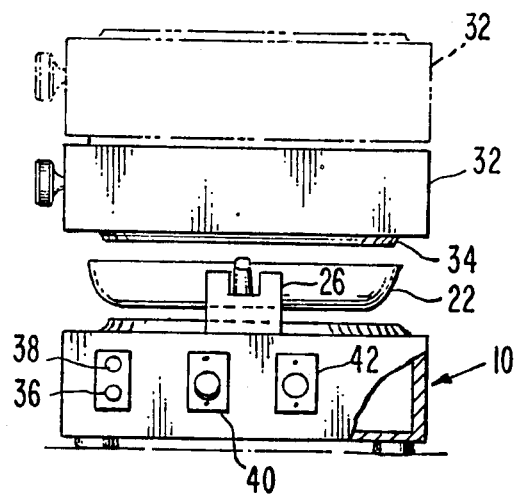
FIG. 2 is a front end elevational view of the device, as seen from the right of FIG. 1, the cover means again being shown in full and dotted lines in operative and inoperative positions, respectively.
Figure 3:
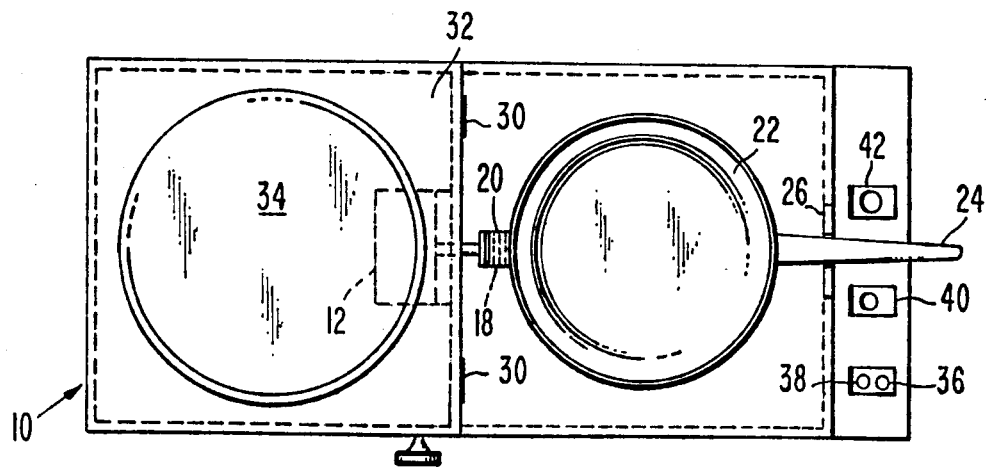
FIG. 3 is a top plan view of the device in which the cover means has been swung to its inoperative, out-of-the-way position.

Referring now to FIG. 2, control means are provided for the device, accessible to a user and disposed, preferably, on the front wall of the lower heating element housing. There is provided, thus, a temperature-control means including lower and upper regulating knobs 36, 38 for regulating the temperature of the lower and upper heating elements 28, 34 respectively. Adjacent said control means, there is provided an adjustment knob 40, by means of which one adjusts the speed of reciprocation of the pan 22. A timer 42 is adapted to be pre-set to the particular length of time that the pan is to be reciprocated before the entire device shuts down. When the pre-set time expires, the heating elements are de-energized, and the reciprocating means is turned off. If desired, a signal lamp and/or audible signal, not shown, can be energized to inform the user that the cooking operation is completed.

Figure 4:
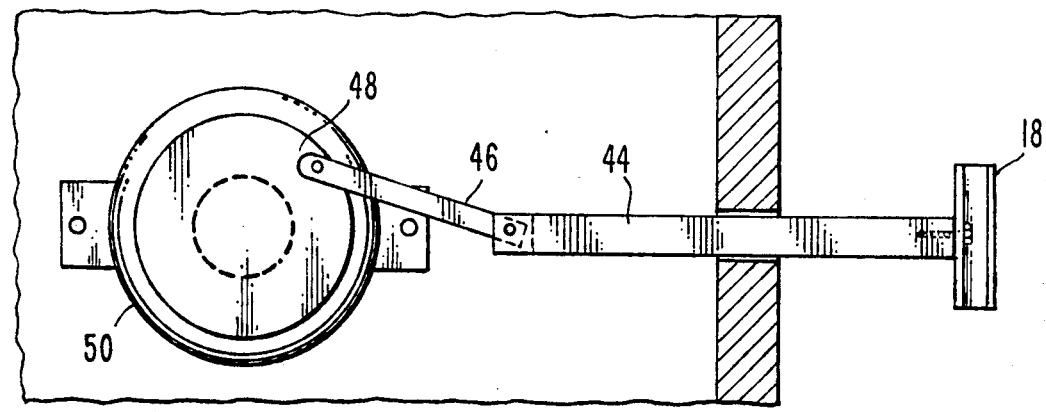
FIG. 4 is an enlarged, horizontal, fragmentary sectional view through the housing of a modified form of the device, showing an alternative means for imparting reciprocating motion to the fry pan.
Figure 5:
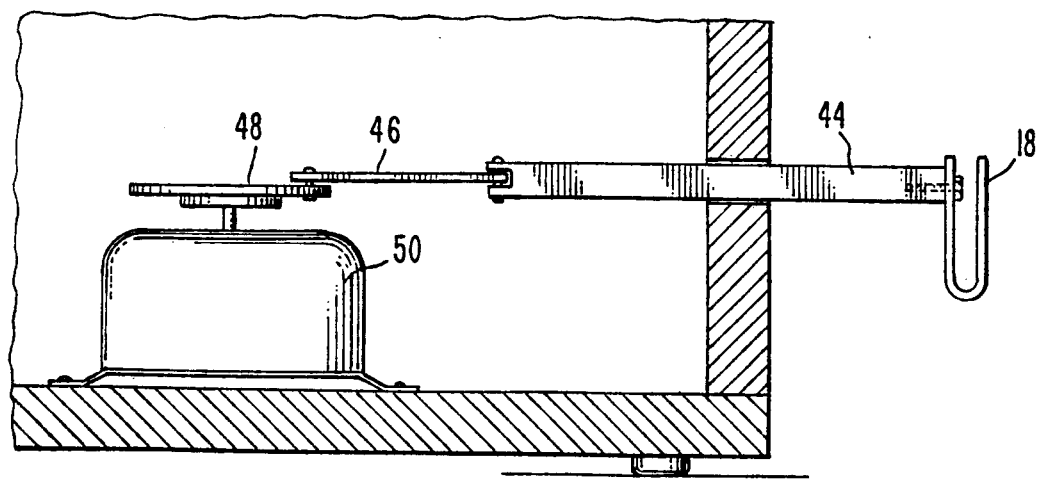
FIG. 5 is a fragmentary, vertical, longitudinal sectional view through the alternative form shown in FIG. 4.

In FIGS. 4 and 5, there is shown a modified arrangement, in which a second type of motor power means and reciprocating mechanism, of a relatively simplified nature, are disclosed. In this arrangement, the reciprocating bracket support arm 44 is used in place of the arm 16, and is slidable in an opening provided in the front wall of the housing, with the upwardly opening, U-shaped bracket 18 being fixedly secured to the distal, forwardly projecting end of said arm 44.

At its inner or rear end, bracket 44 is pivotally connected to a link 46, which is pivotally connected to the peripheral portion of a disk 48 rotated by a variable speed motor 50. The speed of the motor can be readily controlled by means of the speed control means 40 previously described herein.

In use of the disclosed cooking apparatus, let is be assumed that one is cooking an omelet. An omelet is preferably cooked in a fry pan of the type illustrated, having a bottom wall merging smoothly along gently curving lines into the side wall. When the omelet mixture is poured into the fry pan, and heat is applied thereto, it is necessary to almost continuously, gently shake the fry pay back and forth, to keep the omelet mixture from sticking to the fry pan while it cooks.

Even so, it is often not possible to form the omelet to the exact consistency desired, as for example, if one happens to turn off the heating element too soon, or reciprocate the fry pan too close or perhaps too far from the heating element. In such circumstances, the omelet might be either too soft, or too hard, or may be burned, or undercooked.

The present invention obviates the problems heretofore encountered, and assures that the omelet will be cooked not only without constant attendance, but also with uniformity, if directions are followed as to the speed of reciprocation, total cooking time, and proper temperatures for the upper and lower heating elements, for a particular kind of omelet of a particular size.

In accordance with the invention, the omelet mixture is poured into the fry pan, and when the controls have been properly set for heating element temperature, reciprocating speed, and total time, one lowers the cover member 32 and turns on the omelet. If desired, the lowering of the cover member 32 can operate a switch, not shown, for the purpose of initiating the cooking cycle.

During said cycle, as the omelet is cooked the pan 22 will be reciprocated at a desired speed, by the arm 16, with the handle 24 sliding back and forth in the guide bracket 26. Heat will be applied by the elements 28, 34 above and below the fry pan.

Upon completion of the omelet, when the time set on timer 42 expires the entire device will shut down and the cover member 32 can be swung upwardly to permit removal of the fry pan 22.

It may be noted in this regard that the fry pan 22 is placed in operative position to be reciprocated merely by positioning it upon the bracket 18 and bracket 26, a step which presents little more difficulty, if any, than placing the fry pan directly upon the heating element of a kitchen range and certainly presents much less difficulty than holding the fry pan above the heating element while shaking it back and forth until the omelet is cooked.

By reason of the invention, a finished product of a uniform consistency is achieved, each and every time the device is used, all without any attention being given to the device during the actual cooking operation.

Another feature considered to be of considerable value, in the device illustrated and described herein, is found in the capability of using any of a number of cooking vessels differing in size or shape, as desired. For example, one might desire to utilize a fry pan smaller than that illustrated, for smaller omelets, and this requires no more than substitution than one fry pan for another, as long as both fry pans have brackets 20 and handles 24 adapted to be engaged by bracket 18 and guide bracket 26, respectively.

It is also a desirable feature of the device that not only is it usable for cooking omelets, but also, for cooking or broiling foods such as those with cheese toppings, frying eggs, preparing so-called "home fried" potatoes, hash brown potatoes, or the like. And, the device can be used indeed for cooking any of various other foods in which it is desirable to provide a gentle reciprocating motion or an intermittent reciprocating motion of the cooking vessel for the purpose of preventing sticking of the food to the surface of the vessel.

Still another desirable feature of the invention is found in the fact that the cooking vessel, when not in use in the disclosed device, can be used as an ordinary fry pan or skillet, since it is completely conventional to the extent of having a handle 24 and a bracket 20 which, when not in use in the manner shown in the drawings, can even be utilized for hanging the fry pan upon a rack or other support.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A cooking apparatus comprising:
   (a) housing;
   (b) motive means therein including an arm projecting from the housing, and means for reciprocating said arm;
   (c) an upwardly facing heating element mounted in said housing forwardly of said arm;
   (d) a cooking vessel including a handle, said arm and said vessel including cooperating means for detachably connecting the cooking vessel to the arm; and
   (e) means on the housing slidably supporting the handle, whereby to guide the cooking vessel in a straight path upon reciprocation of said vessel by the arm responsive to operation of the motive means, said heating element being disposed below the cooking vessel when the cooking vessel is so supported and reciprocated, whereby to cook the contents of the cooking vessel concurrently with reciprocation of the vessel above the heating means.

2. A cooking apparatus as in claim 1 wherein the means on the arm comprises an upwardly opening U-shaped bracket and the cooperating means on the cooking vessel is in the form of a bracket of inverted U-shape removably seating in the bracket of the arm responsive to movement of the cooking vessel downwardly toward the heating element.

3. A cooking apparatus as in claim 2 wherein the bracket secured to the cooking vessel is disposed diametrically opposite the handle thereof.

4. A cooking apparatus as in claim 3 wherein the guide bracket is aligned with said arm, whereby said handle will be aligned with the guide bracket and will seat therein when the brackets of the cooking vessel and said arm are interengaged.

5. A cooking apparatus as in claim 1 further including a cover member hingedly connected to said housing, and adapted to be swung into position above the cooking vessel when the cooking vessel is engaged with said guide bracket and said arm.

6. A cooking apparatus as in claim 5 further including a heating element in the cover member, adapted to face downwardly toward the cooking vessel responsive to swinging of the cover member into position over said vessel.

7. A cooking apparatus as in claim 6 wherein the cover member, when swung upwardly from its position over said vessel, is movable to a position overlying the housing and moving clear of the cooking vessel to facilitate removal thereof from the guide bracket and the bracket of said arm.

8. A cooking apparatus as in claim 7 further including control means for regulating the speed of reciprocation of said arm.

9. A cooking apparatus as in claim 7 further including control means for the respective heating elements, for controling each of said elements independently of the other.

10. A cooking apparatus as in claim 9 further including means for controlling the length of time that the cooking vessel is reciprocated and is subjected to the heat of said upper and lower heating elements.

11. A cooking apparatus as in claim 1 wherein said motive means is of the saber saw type.

12. A cooking apparatus as in claim 11 wherein said motive means comprises a motor mounted within said housing, a disk rotated by said motor, a link pivotally connected to the disk, the housing including a guide slot for said arm disposed forwardly of said link, and a pivotal connection between said link and said arm, whereby upon rotation of said disk said arm will be imparted a substantially straight line back and forth motion within said slot.

* * * * *